Feb. 10, 1953   J. W. PRICE   2,627,855
FRACTURE NAIL AND BONE PLATE
Filed April 7, 1950
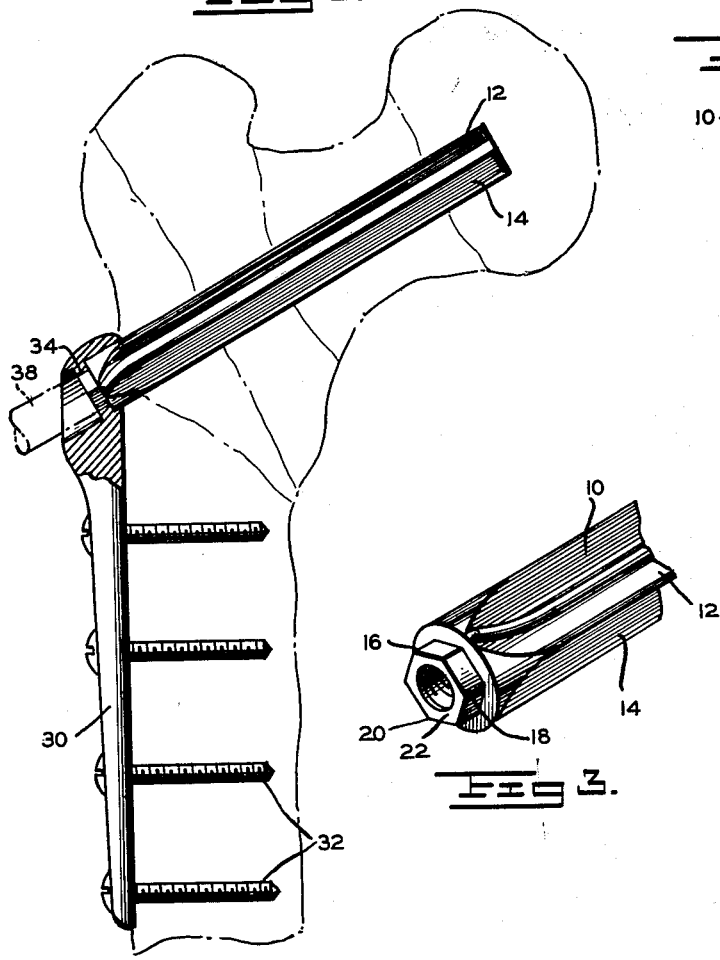
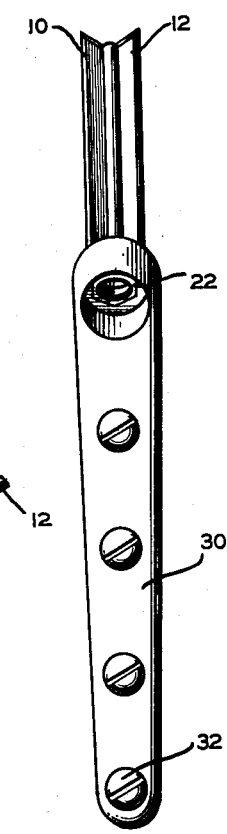
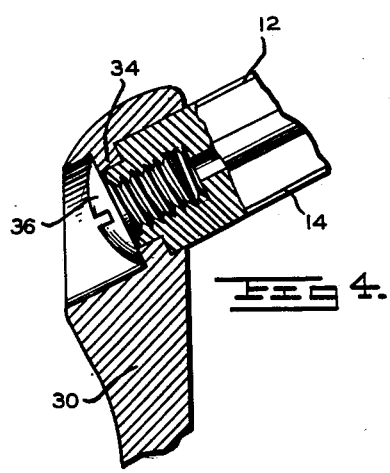
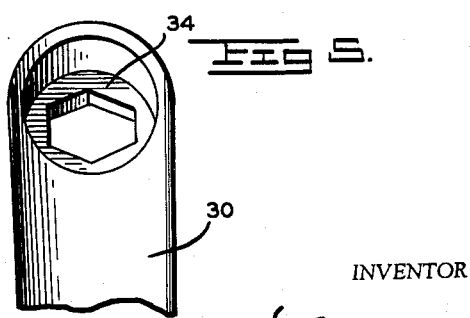
INVENTOR
James W. Price
BY H. Hawks Hodges
ATTORNEY Patented Feb. 10, 1953

2,627,855

UNITED STATES PATENT OFFICE 2,627,855

FRACTURE NAIL AND BONE PLATE

James W. Price, Roanoke, Va.

Application April 7, 1950, Serial No. 154,645

5 Claims. (Cl. 128—92)

In recent years there have been great advances made in the fixation of inter-trochanteric fractures. Medical science has developed techniques whereby the well known Smith-Petersen nail or pin may be successfully used in conjunction with an angular bone plate, preferably of the Thornton type, to properly effect fixation.

The nail and plate are joined or clamped together by means of a screw. The screw passes through a web or shelf in the top of the bone plate and into the head of the nail or pin, having threads to accommodate the screw. When the screw is tightened, the head end of the nail is clamped against the face of the shelf or web in the plate. The face of the bone plate is at an angle corresponding to the angle between the neck and the shaft of the femur. The plate which extends longitudinally along the shaft of the femur is attached to the shaft by means of a number of screws which pass through the body of the plate and the shaft of the femur. The function of the plate is in the nature of a reinforcement to the nail or pin.

However there are certain types of fractures where there is a great amount of torque or twisting strain exerted on the nail and plate, often resulting in the screw, which clamps the nail and plate together, working loose, and allowing rotation between the nail and the plate. This often results in partial or complete failure of the fracture to heal, due to rotation between the nail and plate.

To avoid such possible failure I have devised an interlocking nail and plate which eliminates the possibility of any rotation.

An object of my invention is to provide a fracture nail and bone plate which may be secured together to positively preclude any rotation.

A further object is to provide a fracture nail having a head cut to fit snugly within a socket provided in an end of a bone plate.

A still further object of my invention is to provide a fracture nail or pin having a nut, formed on the head thereof, and a bone plate provided with a complementary cut orifice in one end thereof.

An even further object is to provide a fracture nail having a nut formed on its head end and a bone plate routed to provide a complementary shaped orifice at one end thereof.

In the drawings:

Fig. 1 is a view in side elevation (partly in section), showing a fractured neck of the femur and a shaft of a femur with the nail and bone plate secured into place;

Fig. 2 is a view in front elevation;

Fig. 3 is an enlarged perspective view, partly broken away;

Fig. 4 is an enlarged view partly in vertical cross-section and partly broken away; and Fig. 5 is an enlarged view of the head end of the bone plate, looking from the bone side.

A three flanged fracture nail of the Smith-Petersen type has been utilized, and to which I have added my invention to the head end. The nail disclosed is of the cannulated type, but it will be understood that the nail need not be of that type, it may be of the solid or grooved type if preferred.

The head end of the nail or pin is machined to provide a nut, preferably of the hexagonal shape, but it could be of any desired shape providing that the angles of intersection of the nut faces are aligned with the flanges of the nail.

The nail or pin, clearly disclosed in Figure 3, is provided with three flanges 10, 12, and 14. The flange 10 being in alignment with the intersection 16 of two surfaces of the hexagonal nut 22 machined on the head end of the nail. The flange 12 of the nail is in alignment with the intersection 18 of the hexagonal nut 22 and likewise the intersection 20 is in alignment with the flange 14. The head end of the fracture nail and the hexagonal nut are provided with conventional internal screw threads, the purpose of which will be described more fully hereinafter.

I provide a bone plate 30 having a plurality of apertures placed therein so that suitable screws 32 may be inserted therethrough and driven into the shaft of a femur. The screws hold the plate 30 along the shaft of the femur into the neck of which a fracture nail or pin has been placed. One end of the bone plate 30 is slightly enlarged and is routed out to provide a shelf 34 having its face at an angle of approximately 30° from its axis. The shelf 34 may itself be routed to provide an aperture therethrough, as more clearly disclosed in Figure 5. The aperture is cut preferably in hexagonal form so that the hexagonal nut 22 may fit therein and be maintained in its adjusted position within the aperture by a suitable machine screw or bolt 36. The screw 36 is adapted to be screwed into the internal threads referred to above and positioned within the nut and head end of the fracture nail.

It will be noted, more particularly by a study of Figure 4, that the head end of a surgical nail is to be inserted within the routed out portion of the bone plate, its hexagonal nut being inserted into the aperture within the shelf 34.

In this manner the axis of the fracture nail is held at an angle of 120° from the axis of the bone plate 30. Also, by aligning the edges or intersections 16, 18 and 20, the flanges 10, 12 and 14 will be maintained in their desired position, relative to the bone plate. The flange 14 is aligned downwardly relative to the axis of the bone plate 30. It has been found that it is particularly desirable for one flange to point downwardly relative to the shaft of the femur in order that the nail will not be deflected upwardly while being driven into the femur neck. The flange when in that position may readily cut its way through the arch of the neck of the femur rather than to skid upward.

While I have referred to an angle of 120° between the axes of the nail and bone plate, it will be understood that any other angle can be suitably arranged by the machining of the shelf 34. The practice of orthopedic surgery has found that the neck of the femur in a great majority of instances is at an angle of 120° from the shaft. That angularity often varies a few degrees in either direction and if it is determined that an angle other than 120° is necessary, then a bone plate having the shelf 34 provided at a proper angle may readily be supplied.

At the extreme left, in Figure 1, I have shown a dotted line representation of a fracture nail driver 38. The nail driver is used in order to control the direction of the nail, and the alignment of the plate with the shaft of the femur. The driver is provided with a threaded end which screws into the head of the nail. The plate is clamped between the driver and nail, thus insuring better control of the nail and plate during fixation of the fracture.

By thus properly positioning a nail and aligning it with a bone plate, the possibility of rotation of the nail is positively precluded and a proper fixation of the fracture is materially benefited.

I claim:

1. A fracture nail including a plurality of equally spaced longitudinal flanges, a head at one end of the said nail, and a nut protruding from said head, intersections of the faces of said nut being aligned with the said flanges.

2. A fracture nail including a plurality of equally spaced and laterally extending longitudinal flanges, a head at one end of the said nail, and a nut protruding from the said head, each alternate intersection of two faces of said nut being in axial alignment with one of the said flanges.

3. A bone plate including an enlarged end portion having a shelf machined therein at an angle to the axis of the said plate, and an aperture having a plurality of intersecting sides in said shelf.

4. The combination of a fracture nail and a bone plate; the fracture nail having longitudinal flanges and a head, said head having a nut protruding therefrom; the bone plate having a head provided with a shelf at an angle to the axis of said plate, and an aperture in said shelf adapted to be circumjacent to the said nut.

5. The combination of a fracture nail and a bone plate; the fracture nail having a plurality of laterally extending longitudinal flanges and a nut protruding from its head end; a bone plate having an enlarged portion in which an aperture is cut to be circumjacent to said nut, the intersections of the faces of said nut being aligned with the said flanges.

JAMES W. PRICE.

REFERENCES CITED

The following references are of record in the file of this patent:

UNITED STATES PATENTS

| Number | Name | Date |
| --- | --- | --- |
| 2,441,765 | Hopkins | Mar. 18, 1945 |
| 2,526,959 | Lorenzo | Oct. 24, 1950 |

OTHER REFERENCES

The Journal of Bone & Joint Surgery for October 1941, pages 804–5. (Original in Scientific Library.)

Piedmont Hospital Bulletin, Volume 10, for 1937, pg. 24. (Copy in Division 55.)